United States Patent

[11] 3,616,968

[72] Inventors  Robert C. James;
 Charles G. Hart, Sheboygan, Wis.; John E. Rogers, Suffolk, England; Richard W. Safranski, Sheboygan, Wis.
[21] Appl. No. 814,957
[22] Filed  Apr. 10, 1969
[45] Patented  Nov. 2, 1971
[73] Assignee  Hayssen Manufacturing Company
 Sheboygan, Wis.

[54] AUGER FILLER AND CONTROL THEREFOR
 19 Claims, 16 Drawing Figs.
[52] U.S. Cl. .................................................. 222/70,
  192/12, 222/413
[51] Int. Cl. .................................................... B65g 33/10,
  B65d 5/30, F16d 67/06
[50] Field of Search ............................................ 222/70, 413

[56]  References Cited
  UNITED STATES PATENTS
3,305,133  2/1967  Parker ............................ 222/70
3,148,802  9/1964  Webb ............................. 222/70

2,525,973  10/1950  Sundstrom et al. ............  222/413

Primary Examiner—Leonard Summer
Attorney—Koenig, Senninger, Powers and Leavitt

ABSTRACT: An auger filler for rapid and accurate dispensing of metered quantities of fluent products in which an auger is operated via an electromagnetic clutch and brake unit with reduction gearing between the clutch output and the auger for driving the auger at a lower speed than the clutch output. The unit has a rated voltage and a rated torque, the rated torque being greater than that for driving the auger under load, and provision is made for energizing the clutch at the start of a fill cycle at overexcitation voltage and then dropping the voltage to a holding voltage substantially below the rated voltage, and for deenergizing the clutch at the termination of a fill cycle and energizing the brake at overexcitation voltage and then dropping the voltage to a holding voltage substantially below the rated voltage. A timer effects disengagement of the clutch to stop the auger and means is provided for delaying initiation of the operation of the timer until the auger has rotated a predetermined amount less than the predetermined number of revolutions in a fill cycle.

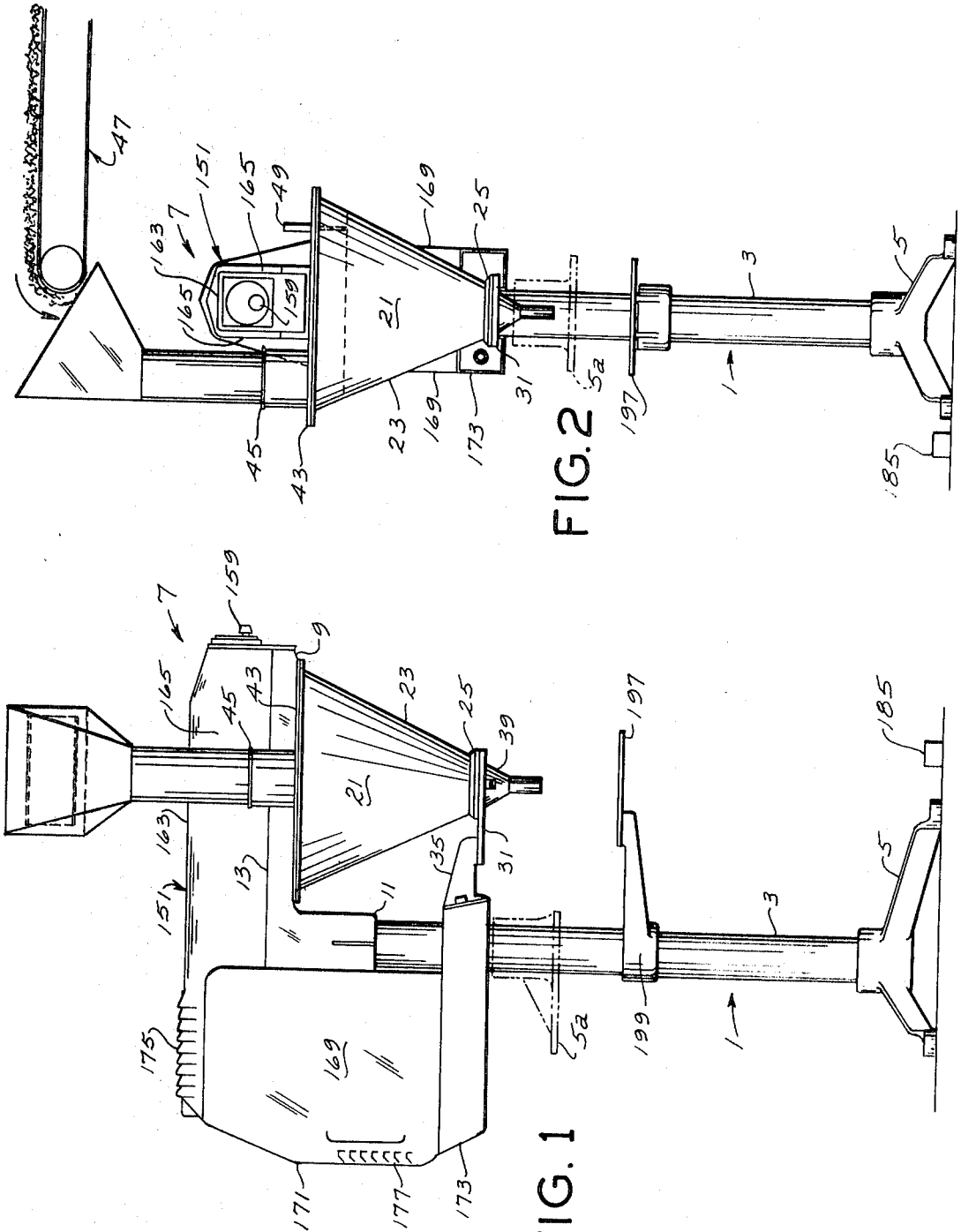

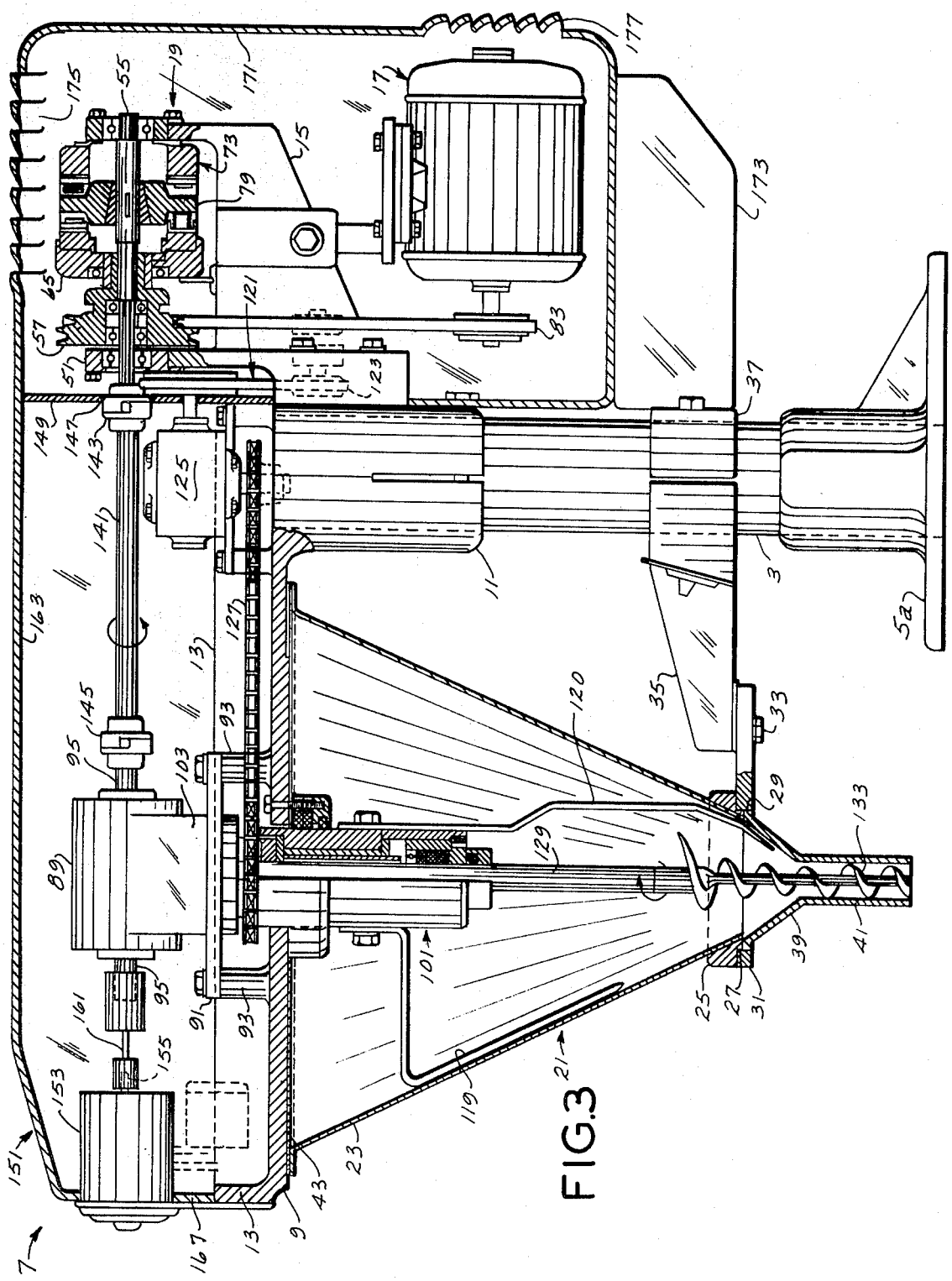

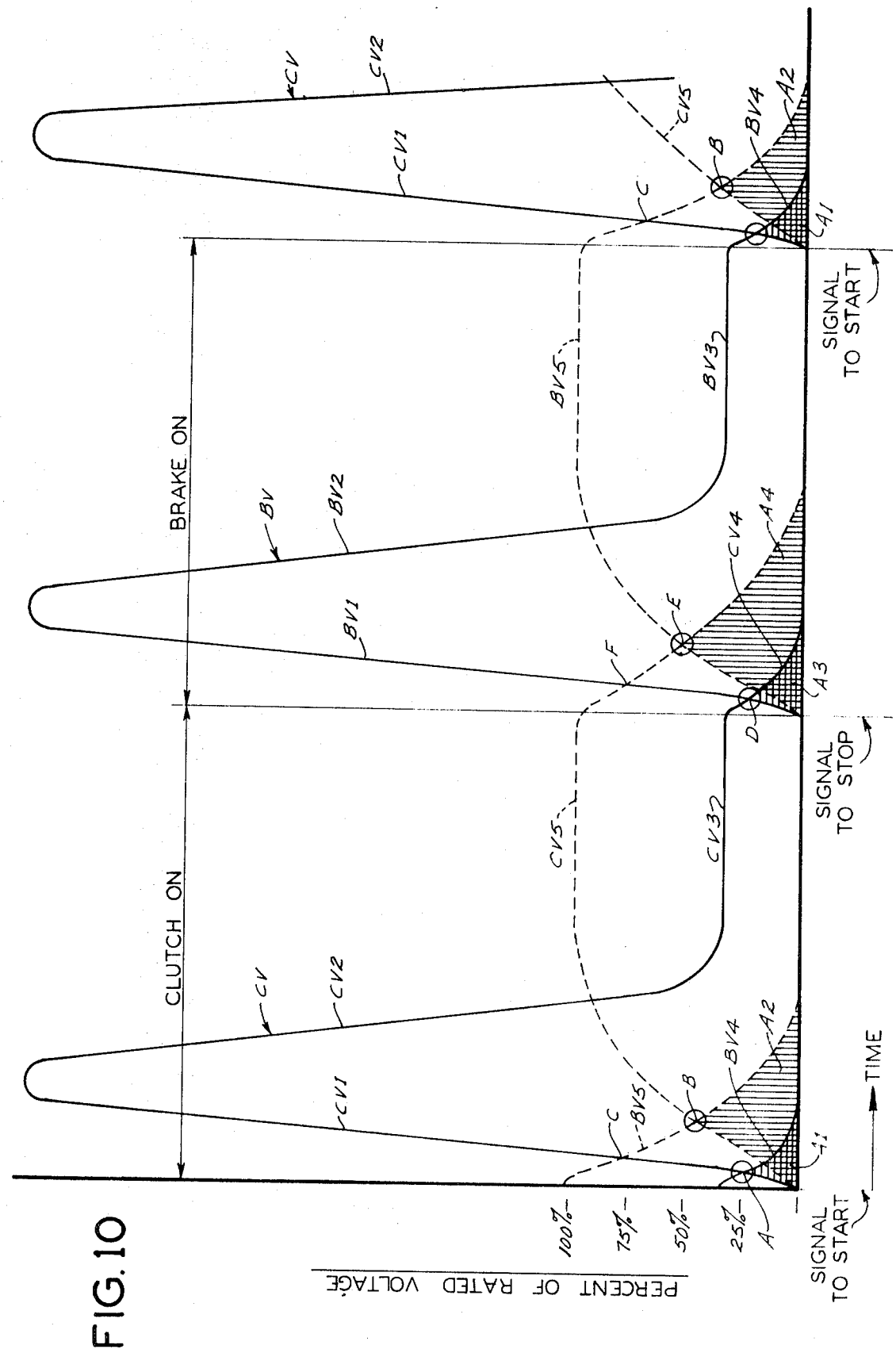

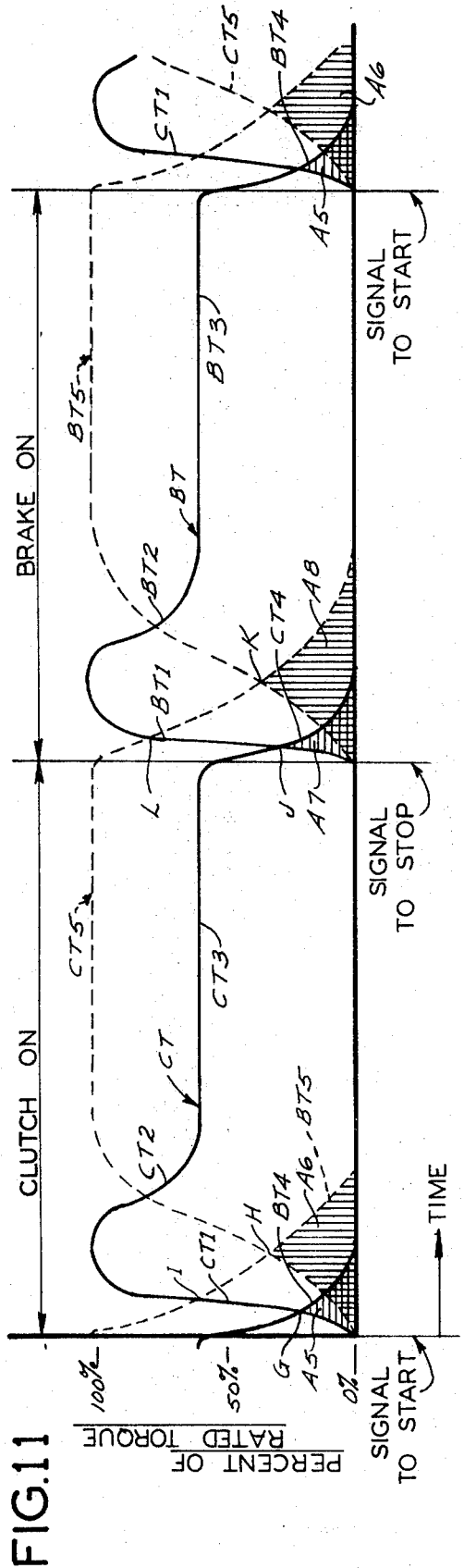
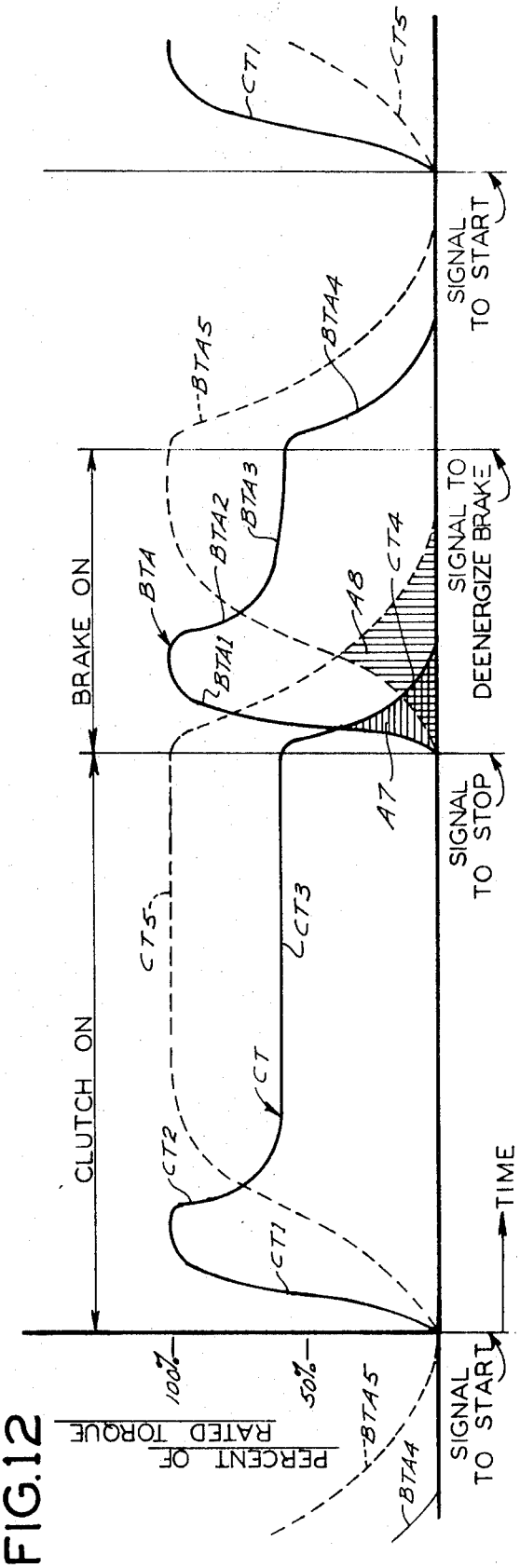

3,616,968

AUGER FILLER AND CONTROL THEREFOR

BACKGROUND OF THE INVENTION

This invention relates to auger fillers and controls therefor, more particularly to an auger filler for augering out into a container a metered quantity of a fluent material, and an electrical control therefor.

Auger filling of containers, such as bags, cans, jars, etc. with fluent products, such as powder or granular materials, viscous materials, gels, etc. has been recognized as a much faster means of filling than weigh filling and as having other advantages, such as being cleaner. It will be understood that auger filling refers to dispensing of a metered amount of the product by rotation of an auger in an auger tube, fed with the product from an appropriate source such as a hopper, the amount dispensed being dependent on the number of revolutions of the auger, and the diameter and pitch of the auger. For a given auger diameter and pitch, the amount dispensed is a function of the number of revolutions of the auger. For accuracy in auger filling, it is essential that the number of revolutions be accurately controlled on each and every fill cycle throughout the run of a given product, otherwise the quantity dispensed may vary from one fill cycle to another beyond allowed tolerances.

It is desirable, for attainment of a high number of fills per minute, that the auger of the filler be driven via a clutch and brake unit, and particularly an electromagnetic clutch and brake unit with its input continuously driven by an electric motor, with the operation involving engagement of the clutch to start a fill cycle and disengagement of the clutch and engagement of the brake to stop the auger and terminate the fill cycle. However, this has involved a problem of consistently obtaining precision control over the operation of the auger for consistent precision metering on each fill cycle, due to such factors as slippage of the clutch or brake, variation in motor speed, slip in the drive from the motor to the clutch and voltage fluctuation. It may also be observed, for example, that any uncontrolled or indeterminate delay in response of the brake to a signal that the auger has completed or is about to complete its predetermined number of revolutions makes it difficult to effect precision stopping of the auger, with resultant imprecision in metering. It has been found that such delay may vary considerably with the load on the auger, generally being greater when the load is smaller, creating a substantial problem in development of a filler adapted for consistent precision metering of various products when the filler may be called upon to dispense.

Compounding the above problems are those of providing ample auger torque to handle loads imposed by various products to be dispensed and avoiding heating of the product in the hopper due to heating of the clutch and brake unit and the motor therefor. It may here be noted that such components inherently generate heat in their operation, and in many instances heating of the product being dispensed is undesirable. In some instances, the auger itself may generate heat, and transmission of any additional heat from the clutch and brake unit and motor to the hopper is most undesirable.

SUMMARY OF THE INVENTION

Accordingly, among the several objects of this invention may be noted the provision of an auger filler of the class described in which precision control over the operation of the auger is consistently obtained for precision metering of various products; the provision of such a filler in which ample driving torque is delivered to the auger during its operation, without interfering with precision control over the number of revolutions of the auger; the provision of an auger filler of the class described in which heating of the product in the hopper by heat generated by the motor, clutch and brake is minimized; and the provision of an auger filler such as described in which the auger is driven via an electromagnetic clutch and brake unit with a precision control system for the latter which avoids undue interference between the clutching and braking operations, with the contemplation that the control system is applicable to devices other than auger fillers in which precision starting and stopping of a rotatable driven element are desired.

In general, an auger filler of the invention comprises a receptacle for containing a fluent material to be metered out, the receptacle having an outlet and an auger for feeding the fluent material from the receptacle out through the outlet, the amount of material fed out through the outlet being a function of the number of revolutions of the auger. The auger is adapted to be driven via a clutch having an input and an output, means being provided for driving the clutch input, with speed reduction means between the clutch output and the auger for driving the auger at a lower speed than the clutch output when the clutch is engaged. Means is provided for effecting engagement of the clutch to drive the auger at said lower speed, and control means operable on completion of rotation of the auger through a predetermined number of revolutions is provided for effecting disengagement of the clutch to stop the auger. Driving the auger from the clutch output via the speed reduction means reduces the effect of inaccuracies in the starting and stopping of the clutch output in inverse proportion to the speed reduction ratio (i.e., if the speed reduction ratio is 2:1, the effect of inaccuracies is halved), and increases the torque of the auger in direct proportion to said ratio.

A further aspect of the invention is the use of an electromagnetic clutch and brake unit for operation of the auger, with this unit having a rated voltage and a rated torque, the rated torque being in excess of that required for driving the auger under load, and control means for said unit comprising means for energizing the clutch of the unit to start the operation of the auger and means operable on completion of rotation of the auger through a predetermined number of revolutions for deenergizing the clutch and energizing the brake of the unit to stop the auger. The clutch energizing means includes means for initially effecting energization of the clutch at a voltage substantially in excess of the rated voltage of the unit and then dropping the voltage to a holding voltage substantially below said rated voltage but sufficient for development of auger driving torque, and the brake energizing means includes means for initially effecting energization of the brake at a voltage substantially in excess of the rated voltage of the unit and then dropping the voltage to a holding voltage substantially below said rated voltage. This control system provides for accurate starting and stopping of the auger, also eliminating or at least substantially reducing interference between the clutching and braking operations and reducing buildup of heat in the clutch and brake unit. Other objects and features will be in part apparent and in part pointed out hereinafter.

BRIEF DESCRIPTION OF THE DRAWINGS

FIG. 1 is a side elevation of an auger filler made in accordance with this invention;

FIG. 2 is a front end elevation of the FIG. 1 filler;

FIG. 3 is an enlarged view of the upper portion of the filler with parts broken away and shown in section;

FIGS. 10–12 are graphs showing certain characteristic curves; and

Corresponding reference characters indicate corresponding parts throughout the several views of the drawings.

DESCRIPTION OF THE PREFERRED EMBODIMENTS

Figure 4:
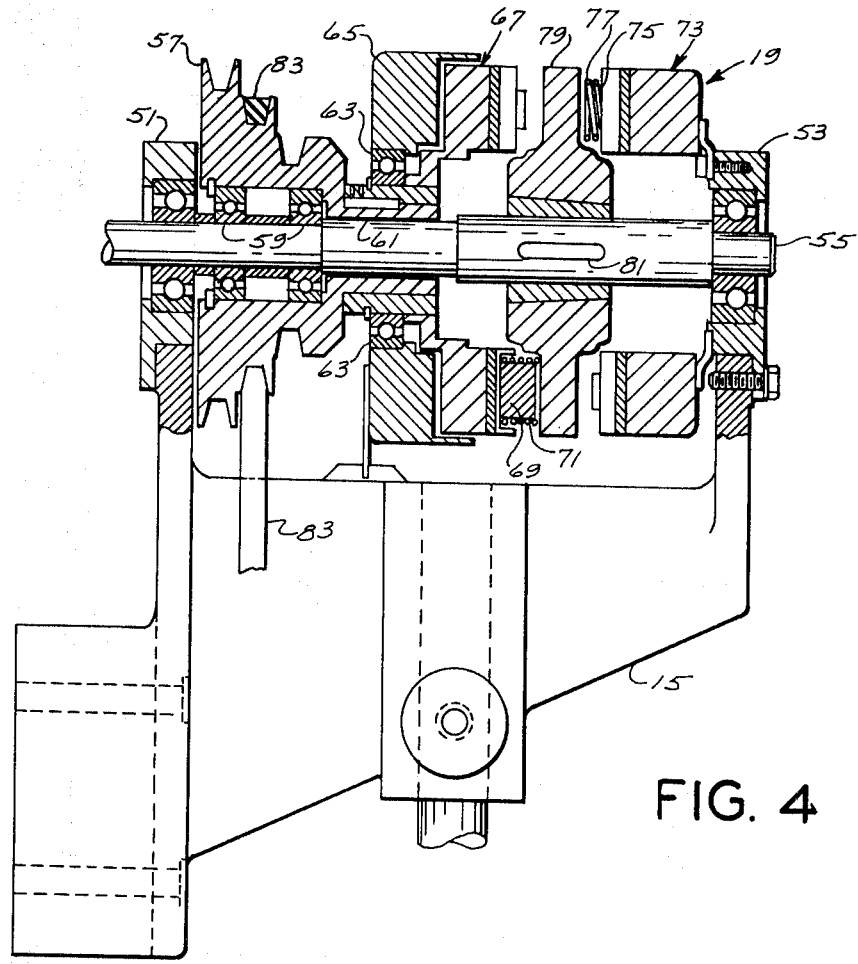
FIGS. 4 and 5 are further enlarged sections showing details.

Referring to the drawings, first more particularly to FIGS. 1-3, an auger filler made in accordance with this invention is shown to comprise a supporting structure generally designated 1 constituted by a post or column 3 extending upward from a pedestal 5. The latter is adapted for floor mounting of the filler. The filler may also be bench-mounted as by means of a bracket indicated at 5a. On the upper end of the post is mounted a head structure generally designated 7. This comprises a horizontal bracket arm 9 extending radially from the upper end of a split collar 11 clamped on the upper end of the post. The arm is in the form of a relatively long narrow rectangular plate and has an upwardly extending peripheral flange 13 formed integrally therewith. The collar 11 has a bracket generally designated 15 on the side opposite the arm 9 supporting an electric motor 17 and an electromagnetic clutch and brake unit 19.

Below arm 9 is a receptacle or hopper 21 for containing a supply of fluent material to be dispensed. This comprises an inverted frustoconical sheet metal body 23, made of stainless steel, for example. The lower (smaller) end of the hopper body, which is open, seats within a ring 25, the latter being secured in place around the lower end of the hopper body. The ring has a reduced-diameter downward extension 27 which fits within the upper portion of a circular opening 29 in a mounting plate 31 detachably secured at 33 to the bottom of an arm 35 extending from a split collar 37 clamped on the post some distance below the collar 11. A funnel 39 has its upper end suitably secured within the lower part of the opening and extends downward therefrom, forming a continuation of the hopper body. The funnel has a cylindric lower end 41 constituting an auger tube. The hopper body has a circular cover 43 provided with a filling duct 45 located at one side of the arm 9. Fluent material may be fed into the hopper through this duct as, for example, by a conveyor belt 47 driven on demand by means of a product level sensor 49 in the hopper, this detail not being critical so far as the present invention is concerned, and hence not further described.

Referring more particularly to FIG. 4, the electromagnetic clutch and brake unit 19 is shown to comprise an inboard bearing member 51 and an outboard bearing member 53 mounted on bracket 15. A clutch output shaft 55 is journaled at its ends in these members. A stepped clutch input pulley 57 is journaled as indicated at 59 on the output shaft adjacent member 51. This pulley has an integral tubular shaft 61, constituting the clutch input or drive shaft, extending therefrom surrounding the output shaft 55, and journaled as indicated at 63 in an intermediate bearing member 65. The input shaft has an electromagnetic driving element 67 secured on its inner end, located on the inside of member 65. Driving element 67 has magnetic pole pieces 69 and a winding for the latter as indicated at 71. An annular electromagnetic brake element 73 having pole pieces 75 and a winding 77 for the latter is secured to the outboard bearing member 53 in position surrounding the output shaft 55. A magnetic armature 79 constituting the driven element of the clutch is splined as indicated at 81 on the output shaft 55 for rotation therewith and axial sliding movement thereon between the driving element 67 and the brake element 73. The pulley 57 for input shaft 61 carrying the driving element 67 is adapted to the continuously driven by the motor 17 via a belt driven 83, the steps of the pulley permitting change in speed of the driving element. The arrangement is such that on energization of the driving element 67, with brake element 73 deenergized, the the driven element 79 is magnetically pulled against and held in engagement with the driving element 67 for driving the output shaft 55, and on deenergization of the driving element 67 and energization of the brake element 73, the driven element is magnetically pulled against and held in engagement with the brake element to stop the output shaft. It is characteristic of this type of electromagnetic clutch and brake unit that it generates considerable heat in operation; also that at relatively low speeds its torque transmission is relatively low.

Figure 5:
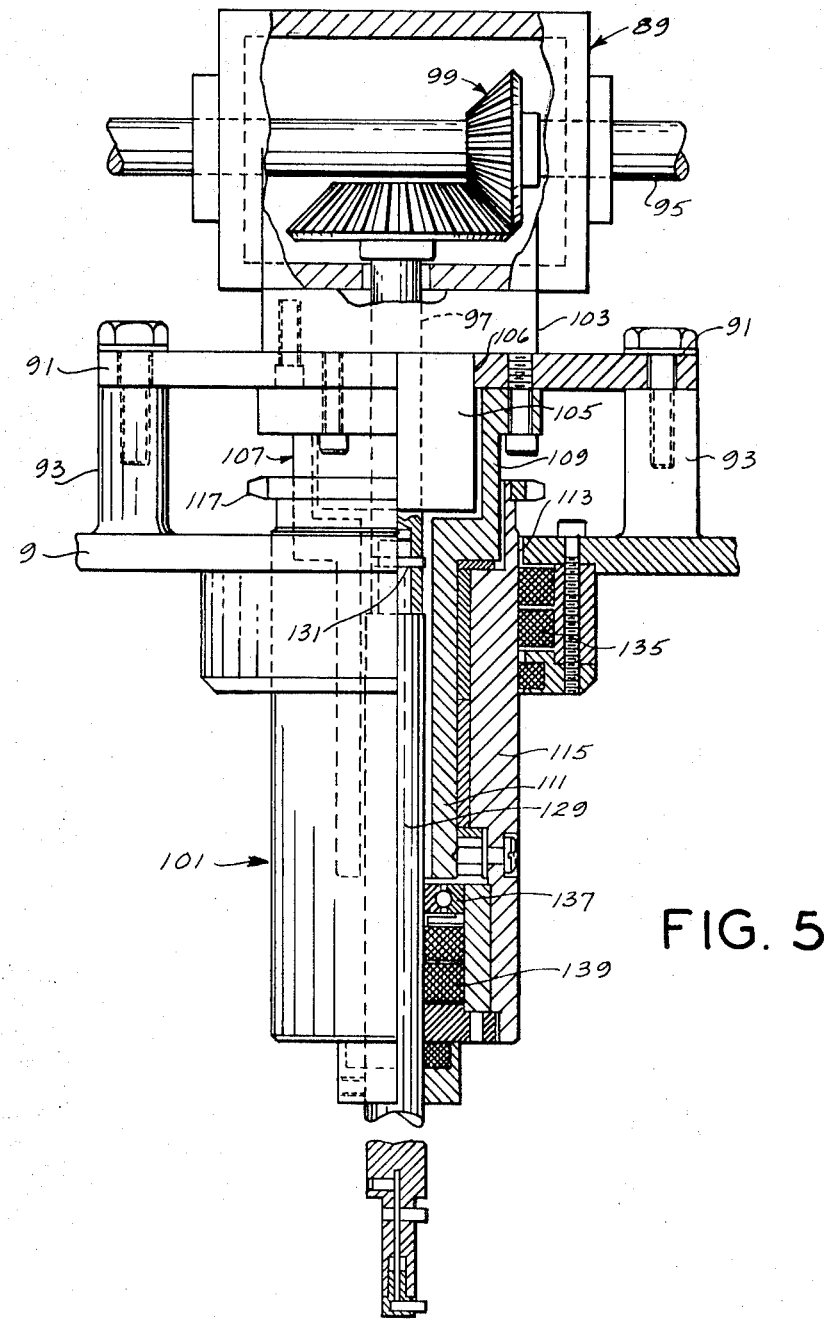

A right-angle drive reduction per box 89 is mounted on a platform 91 above the arm 9, this platform being supported on short posts 93 extending up from arm 9. Gear box 89 is preferably a totally enclosed oil-filled sealed gear box, having a horizontal input shaft 95 which extends out through opposite ends of the box, and a vertical output shaft 97 (see FIG. 5) extending downwardly from the lower end of the box, with bevel gearing as indicated at 99 in the box adapted for driving the vertical output shaft 97 from the horizontal input shaft 95 with a substantial reduction ratio which may range, for example, from a 1:5:1 reduction ratio to a 2:1 reduction ratio. The gear box 89 is mounted on platform 91 with its vertical output shaft 97 coaxial with the hopper, the output shaft extending down into the hopper 21 through a spindle assembly generally designated 101. The box has a lower section 103 bearing on the platform 91 and secured thereto, and a cylindric portion 105 extending down from section 103 through an opening 106 in the platform. The vertical output shaft 97 extends down through lower section 103 and cylindric portion 105 of the box, extending out of the lower end of portion 105.

The spindle assembly 101 comprises a tubular supporting element generally designated 107 having an upper section 109 secured at its upper end to the bottom of platform 91 surrounding the cylindric portion 105 of the gear box, and a reduced-diameter lower section 111. The lower end of section 109 is received in an opening 113 in the arm 9, and section 111 extends down below the arm into the hopper. A quill 115 is journaled for rotation on element 107, the upper end of this quill extending through opening 113 above the arm 9 and having a sprocket 117 thereon. Agitators 119 and 120 are fixed to the quill (see FIG. 3) extending downward therefrom in the hopper for stirring the contents of the hopper. These agitators are optional. The quill is driven from the belt drive 83 via a drive such as indicated at 121 including a power takeoff 123 from the belt, a reduction gear box 125 and a chain and sprocket drive 127 connected to sprocket 117.

A spindle 129 has its upper end secured as indicated at 131 to the lower end of the output shaft 97 of the gear box 89. This spindle 129 extends downward out of the lower end of section 111 of element 107 and is formed at its lower end for quick coupling thereto and uncoupling therefrom of the upper end of an auger 133. The latter extends downward from the lower end of shaft 119 into the auger tube 41 of funnel 39. A seal is provided at 135 for the upper end portion of the quill 115. A bearing 137 is provided between the lower portion of the quill and the spindle 129, and below this is a seal 139 between the quill and the spindle.

The gear box 89 is spaced out on arm 9 from the clutch and brake unit 19, and has its input shaft 95 generally aligned with the clutch output shaft 55. Shaft 95 extends out of the gear box 89 at both ends. The clutch output shaft 55 is flexibly connected to one end of the shaft 95 by means of an elongate shaft 141 having resilient couplings 143 and 145 at its ends connected to the respective ends of shaft 55 and 95. The coupling 143 between the clutch output shaft 55 and the shaft 141 extends through an opening 147 in a heat barrier 149 constituted by a partition within a housing 151 on arm 9. A counter 153 for counting the revolutions of the clutch output shaft 55 is mounted in the outer end of this housing. This counter, as illustrated in connection with FIGS. 3 and 6, may be a conventional precision mechanical revolution counter of a readily commercially available type having an input shaft 155, and mechanism operated off the input shaft for actuating a counter switch 157 (see FIG. 6) after rotation of the input shaft through a predetermined number of revolutions, with an adjustment feature including an adjustment member 159 for varying the number of revolutions to be counted out before actuation of the switch. Preferably, the counter is one which provides for stepless variation of the count to control the amount metered out by the filler down to milligrams. A flexible coupling 161 is provided between the input shaft 95 of gear box 89 and the input shaft 155 of the counter. It will thus be observed that there is, in effect, a direct connection between the clutch output shaft and the counter and that the latter counts the revolutions of the clutch output shaft.

The housing 151 encloses the mechanism on top of arm 9, the clutch and brake unit 19 and the motor 17. It has a top wall 163, sidewalls 165 extending down to the flanges 13 at the sides of arm 9, and a front wall 167 extending down to the flange 13 at the outer end of arm 9. Counter 153 is mounted in the front wall 167. THe sidewalls 165 have extensions 169 at the rear of the housing spanned by a rear wall 171 for enclosing the unit 19 and motor 17. The bottom of the rearward portion of the housing bears on a box 173 associated with arm 35 and split collar 37 which may house electrical controls of the filler. The housing is louvered as indicated at 175 and 177 for rearward exit of air to dissipate heat generated by motor 17 and unit 19 toward the rear, to keep it away from the hopper. The housing is preferably made of metal to assist in heat dissipation.

Figure 6:
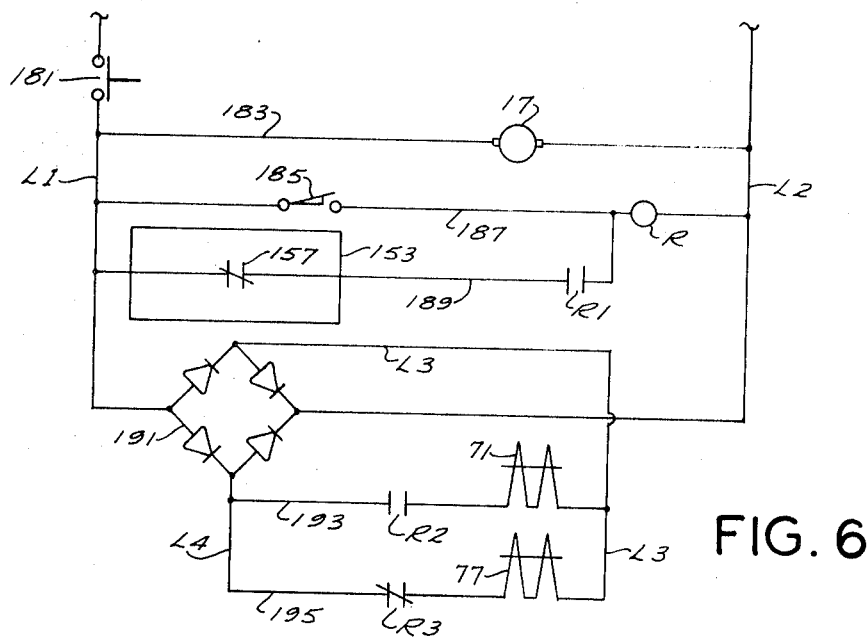
FIG. 6 is a wiring diagram.

Referring to FIG. 6, a simplified circuit for the filler is shown in which the motor 17 is illustrated as connected across AC power lines L1 and L2 having an on-off switch 181 in a circuit 183. Fill cycle start switch 185 is shown as connected across lines L1 and L2 in a circuit 187 including a relay R. This switch 185 may be, for example, a pedal-operated switch (in the case of a manually operated filler) or a switch operated by a cam of an automatic packaging machine, etc. The counter switch 157 is shown as connected in parallel with the switch 185 in a circuit 189 including normally open contacts R1 of relay R. The clutch winding 71 is connected across DC power lines L3 and L4, which may be supplied from lines L1 and L2 via a rectifier bridge 191, in a circuit 193 including normally open contacts R2 of relay R. The brake winding 77 is connected across lines L3 and L4 in a circuit 195 including normally closed contacts R3 of relay R.

In the operation of the filler, switch 181 is maintained closed for continuous operation of motor 17 and the clutch input shaft 61, and the auger 133 is cycled on and off by operation of the clutch and brake unit 19. With motor 17 in operation, the agitator quill 115 carrying the agitators 119 and 120 is continuously driven to stir the fluent material in the hopper 21. A metering cycle of the auger is initiated by closure of switch 185 with resultant energization of relay R and closure of its contacts R1 and R2 and opening of its contacts R3. This establishes a holding circuit for relay R via closed contacts R1, deenergizes the brake winding 77 and energizes the clutch winding 71, so that the clutch output shaft 55 is driven by driving element 67 on the clutch input shaft 61. This results in driving of the auger 133 to auger out fluent material from the hopper 21 to fill a container (not shown) which may be supported on a platform 197 carried by a split collar 199 clamped on the post 3 below the hopper. The driving of the auger 133 is via the reduction gear box 89 so that the auger 133 rotates at a speed substantially less than that of the clutch output shaft, e.g., the speed reduction as between the output shaft and the auger may range from a 1.5:1 reduction to a 2:1 reduction. The clutch output shaft may rotate, for example, at 2,000 r.p.m. and the auger at 1,000 r.p.m. The stepped pulley may provide, for example, for a clutch output shaft speed of 1,450 r.p.m., 2,000 r.p.m. or 2,450 r.p.m., with corresponding speeds of 725 r.p.m., 1,000 r.p.m. or 1,225 r.p.m. for the auger (using a 2:1 reduction ratio).

The counter 153 directly counts the number of revolutions of the clutch output shaft 55 (as distinguished from counting the number of revolutions of the auger). When the counter 153 has counted out a predetermined number of revolutions of the clutch output shaft 55 (corresponding generally to the number of revolutions of the auger required for metering out a particular quantity of product from the hopper multiplied by the reduction ratio), the counter switch 157 opens to break the holding circuit for relay R, with resultant opening of contacts R1 and R2, and closure of contacts R3. As a result, the clutch winding 71 is deenergized and the brake winding 77 is energized to stop the clutch output shaft 55 and hence to stop the auger.

The interposition of the reduction gear box 89 between the clutch output shaft 55 and the auger and the actuation of the counter from the output shaft accomplishes two important results. First, it substantially reduces the effect of overrun of the clutch output shaft such as may occur because of time lag between the instant of opening the counter switch and the stopping of the output shaft, noting that the effect of overrun of the clutch output shaft on the auger is reduced in inverse proportion to the speed reduction ratio of the gear box. Thus, for example, if this ratio is 2:1, and if the clutch output shaft should overrun 0.1 revolution, the auger would overrun only 0.05 revolution. This is in distinct contrast to having the auger driven directly from the clutch output shaft at the same speed as the latter, which, for a clutch output shaft overrun of 0.1 revolution, for example, would result in the same error in the number of revolutions of the auger. The second result, cumulative with this reduction in error, is that the gearing down of the auger results in increased auger torque; e.g., with a 2:1 speed reduction ratio, the auger torque is doubled over that of the clutch output shaft.

It is within the scope of the invention to use an interval timer, instead of a revolution counter, to control the stopping of the auger 133, noting that for a given speed of the clutch output shaft 55, the number of revolutions thereof is a direct function of the interval of time during which it rotates. Thus, it is contemplated that the revolution counter 153 may be replaced by an interval timer having a switch or the like (corresponding in function to switch 157), the timer being started in operation either immediately upon initiation of rotation of the clutch output shaft 55 or with a delay until the auger has rotated through a predetermined amount less than its full predetermined number of revolutions, and actuating the switch after a predetermined time interval. In this regard, the timer is preferably one adapted to be set to time out various time intervals in infinitely variable manner, such timers being well known and commercially available.

Figure 7:
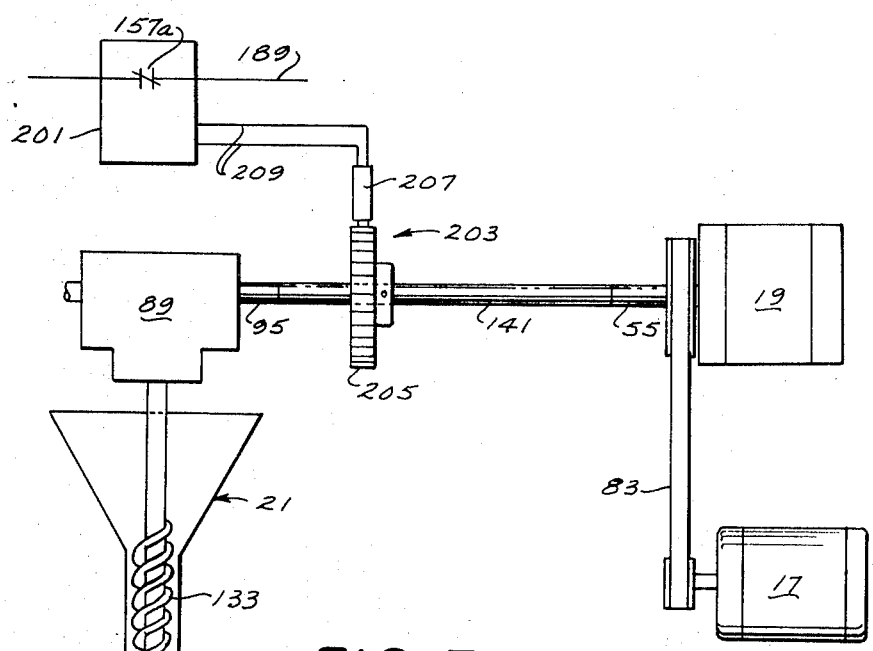
FIG. 7 is a view illustrating a modification of the control system for the filler.

FIG. 7 illustrates the use of such a timer, indicated at 201, which is started in operation to time out a time interval in response to initiation of rotation of the clutch output shaft 55 via a motion sensor means generally indicated at 203 which may comprise a rotor 205 keyed on shaft 141 (which is, in effect, an extension of shaft 55) an d an electromagnetic pickup 207 mounted in fixed position adjacent the periphery of the rotor. The rotor, as shown, may be a toothed ferromagnetic disk and the pickup may include a permanent magnet and a coil, with the arrangement such that, on rotation of the disk, the flux field of the magnet is varied to generate a signal current in the coil. The latter is connected as indicated at 209 to the timer, and the signal starts the timer to time out its preset time interval. When the timer has timed out this interval, it opens a switch 157a to energize the clutch winding 71 and energize the brake winding 77 in the same manner as switch 157.

Figure 8:
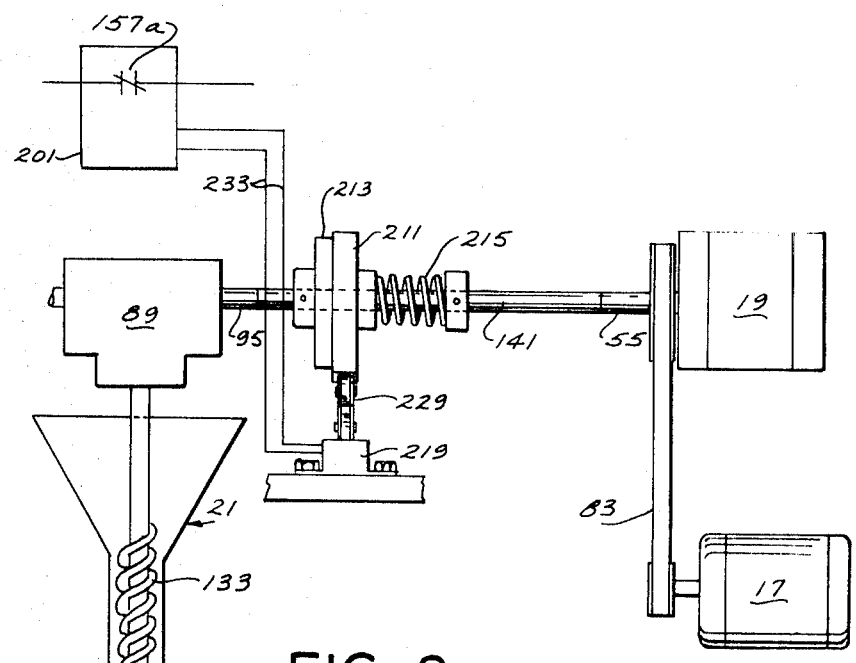
FIG. 8 is a view illustrating a further modification of the control system for the filler.
Figure 9:
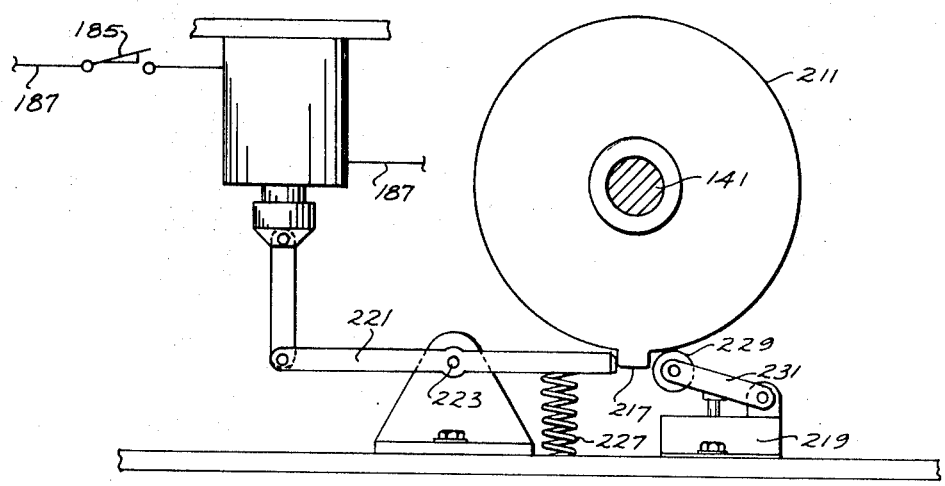
FIG. 9 is a view showing a detail of the FIG. 8 system.

FIGS. 8 and 9 illustrate a system for delaying the start of the timer 201 until the auger 133 has rotated through a predetermined fraction of its full predetermined number of revolutions. As shown therein, this system involves provision of a switch-actuating signal disk or cam 211 loosely mounted on shaft 141 so that it may stop while shaft 141 continues to rotate. A friction disk 213 is keyed on shaft 141 and the signal disk is biased axially on the shaft into contact with the friction disk by a spring 215. The signal disk has a lobe 217 for actuating a switch 219. This lobe is engageable with a stop pawl 221 pivoted as indicated at 223 and controlled by a solenoid 225. When the solenoid is deenergized, the pawl 221 is biased by a spring 227 into an operative position engageable by the lobe for holding the signal disk 211 against rotation. Upon energization of the solenoid 225, the pawl 221 is retracted to allow the signal disk 211 to rotate, and the solenoid is immediately deenergized to allow the pawl to return to its operative position so as to stop the signal disk after it has been rotated through one revolution by the friction disk 213. Switch 219 is located with a roller 229 on the end of its operating arm 231 in position for engagement by lobe 217 as the signal disk 211 approaches the end of its revolution momentarily to actuate the switch, the lobe riding off the roller as the wherein disk completes its revolution. Switch 219 is interconnected with the timer as indicated at 233. On closure of the switch 219, a signal is transmitted to the timer to start the timer to time out a preset time interval, and when the timer has timed out this interval, it actuates switch 157a to the clutch, the clutch winding 71 and energize the brake winding 77. This preset time interval is that required for the auger 133, according to its speed of rotation, to rotate through a number of revolutions equal to its full number of revolutions the timer, for metering out the desired quantity of product minus the fraction of a revolution made by the auger before the switch 219 is actuated by the signal disk. Thus, the start of the timer is delayed until the auger 133 has rotated through said fraction of a revolution (i.e., until shaft 141 has rotated through approximately one revolution) and this eliminates or at least substantially reduces the effect of any clutch slippage such as may occur on startup. The solenoid 225 may be interconnected in series with the start switch 185 in circuit 187 so that it is momentarily energized on momentary closure of the start switch for retraction of pawl 221 at the start of a fill cycle. If desired, suitable means may be provided for delaying the deenergization of the solenoid 225 and the effective closure of switch 219 so that the solenoid holds the pawl 221 in retracted position for two, three or more revolutions of the signal disk 211 before the latter effectively actuates switch 219, as long as the number of revolutions made by disk 211 before it effectively actuates switch 219 is less than the total number of revolutions required for rotating the auger 133 through its full cycle.

The invention further involves the use of a special control system for obtaining rapid starting and stopping of the clutch output by overexcitation of the clutch and brake windings 71 and 77, without excessive interference between the clutching and braking operations of unit 19 and without excessive heating thereof. In this regard, it will be understood that when the brake winding of an electromagnetic clutch and brake unit such as 19 is deenergized and the clutch winding is energized, there is a lag in the decay of the brake flux field and a lag in the buildup of the clutch flux field and, conversely, when the clutch winding is deenergized and the brake winding is energized, there is a lag in the decay of the clutch flux field and a lag in the buildup of the brake flux field. Thus, both on starting and stopping, there is interference between the decaying clutch and brake fields. We have found that, if the clutch winding of a unit such as 19 is overexcited at the start and then dropped to the rated voltage of the unit, and if the brake winding is overexcited to stop and then dropped to the rated voltage, the interference between the decaying clutch and brake fields is excessive, resulting in severe mechanical shock within the unit (heard as a heavy thumping) and high heat buildup in the unit. However, we have further found that the effect of this interference of the decaying fields may be minimized by using an electromagnetic clutch and brake unit at 19 which has a rate voltage and a rated torque, the rated torque being substantially in excess of that required for driving the auger 133 under load, and, on startup, energizing the clutch winding at a voltage substantially in excess of the rated voltage and then dropping the voltage to a holding voltage substantially below the rated voltage but sufficient for development of auger driving torque, and, for rapid stopping, energizing the brake winding at a voltage substantially in excess of the rated voltage and then dropping the voltage to a holding voltage substantially below the rated voltage. The rated torque may, for example, be twice that required for driving the auger under load, or more. The use of an electromagnetic clutch and brake unit having a rated torque substantially in excess of that required for driving the auger, i.e., the use of a unit considerably overpowered for its particular load requirement, and operation thereof as described, minimizes opposition of the decaying fields, and thus minimizes shock and heat buildup.

The above is illustrated by the graphs of FIGS. 10 and 11, FIG. 10 showing relative voltage levels in the clutch and brake winding during intervals of clutch actuation and deactuation, and FIG. 11 showing relative torque levels of the clutch and brake during these intervals. Referring first to FIG. 10, wherein the horizontal coordinate represents time and the vertical coordinate represents percent of rated voltage, curve CV represents the percentage of rated voltage applied to the clutch winding 71 and curve BV represents the percentages of rated voltage supplied to the brake winding 77 in accordance with this invention. It will be observed that, on the signal to start, the voltage applied to the clutch winding (curve CV) is rapidly raised as indicated at CV1 to a value considerably in excess of the rated voltage of the electromagnetic clutch and brake unit (to about 250 percent of the rated voltage as shown for purposes of illustration only) and then rapidly dropped as indicated at CV2 to a holding voltage value substantially below the rated voltage (to about 35 percent of the rated voltage as shown for purposes of illustration only). This holding voltage is then maintained as indicated at CV3 to the instant of the signal for deenergization of the clutch winding and the energization of the brake winding, identified in FIG. 10 as the signal to stop. At this point, the voltage in the clutch winding starts to decay, and the decay is indicated at CV4. On the signal to stop, voltage is applied to the brake winding, being rapidly raised as indicated at BV1 to a value considerably in excess of the rate voltage (e.g., to about 250 percent of the rated voltage as shown for purposes of illustration only) and then rapidly dropped as indicated at BV2 to a holding voltage substantially below the rated voltage (e.g., to about 35 percent of the rated voltage as shown for purposes of illustration only). This brake holding voltage is then maintained as indicated at BV3 to the instant of the next start signal for deenergization of the brake winding and energization of the clutch winding. At this point the voltage in the brake winding starts to decay, and the decay is indicated at BV4.

It will be observed that, on a start, BV4 crosses CV1 at point A, which is quite low on the vertical scale (below 25 percent of the rated voltage, as shown). The horizontally lined area denoted A1 in FIG. 10 represents the extent of the conflicting voltage overlap of the brake and clutch fields, and, as is apparent from FIG. 10, this area is quite small. What this means is that the interference from the decaying flux field of the brake winding on the increasing flux field of the clutch winding is very minor. In this manner, undue conflict between the clutch and brake and undue heat buildup are avoided while providing for a rapid clutch response. This is in sharp contrast, for example, to starting and stopping by application of rated voltage to the clutch and brake windings without overexcitation as denoted by curves CV5 and BV5, noting that the crossover point B of curves CV5 and BV5 is considerably higher than point A (at about 40% of the rated voltage, as illustrated) and that the extent of the conflicting voltage overlap of the brake and clutch fields, represented by the vertically lined area A2 shown in FIG. 10, is considerably greater than the extent of area A1. It is in even sharper contrast to the situation that occurs if the clutch winding were overexcited and then dropped to the rated voltage, in which case the crossover point would be at C, even higher than B.

It will be similarly observed that, on a stop, CV4 crosses BV1 at point D, which is quite low on the vertical scale (below 25 percent of the rated voltage, as shown). The horizontally lined area denoted A3 in FIG. 10 represents the extent of the conflicting voltage overlap of the clutch and brake fields, and, as is apparent from FIG. 10, this area is quite small. What this means is that the interference from the decaying flux field of the clutch winding on the increasing flux field of the brake winding is very minor. In this manner, undue conflict between the brake and clutch and undue heat buildup are avoided, while providing for a rapid brake response. This is in sharp contrast, for example, to stopping by application of rated voltage to the brake winding without overexcitation as denoted by curve BV5, noting that the crossover point E of curves BV5 and CV5 is considerably higher than point D (at about 40 percent of the rated voltage, as illustrated) and that the extent of the conflicting voltage overlap of the brake and clutch fields, represented by the vertically lined area A4 shown in FIG. 10, is considerably greater than the extent of area A3. It is in even sharper contrast to the situation that occurs if the clutch winding were overexcited and then dropped to the rated voltage, in which case the crossover point would be at F, even higher than E.

Referring to FIG. 11, wherein the horizontal coordinate represents time and the vertical coordinate represents percent of rated torque, curve CT represents the percent of rated torque developed by the clutch and curve BT represents the percent of rated torque developed by the brake in accordance with this invention. It will be observed that, on the signal to start, the clutch torque rapidly rises as indicated at CT1 to a value of about 100 percent of the rated torque (as shown for purposes of illustration only), and then rapidly drops down as indicated at CT2 to a value substantially below the rated torque (about 55 percent of the rated torque as shown for purposes of illustration only), and then holds steady at this value as indicated at CT3 until the signal to stop. It then drops off (in the clutch winding decay time) to 0, as indicated at CT4. On the signal to stop, the brake torque rapidly rises as indicated at BT1 to a value of about 100 percent of the rated torque (as shown for purposes of illustration only), and then drops down as indicated at BT2 to a value substantially below the rated torque (about 55 percent of the rated torque as shown for purposes of illustration only), and then holds steady at this value as indicated at BT3 until the next signal to start. It then drops off (in the brake winding decay time) to 0, as indicated at BT4.

It will be observed that, on a start, CT1 crosses BT4 at point G which is well below 50 percent of the rated torque. The horizontally lined area denoted A5 in FIG. 11 represents the total amount of power overlap which occurs on starting, and, as will be seen, this is quite small. Noting that power overlap is dissipated in the form of heat, this means that the amount of heat generated on a start is low. This is in sharp contrast, for example, to the power overlap which would result from operation of the unit 19 at rated voltage and rated torque, the clutch and brake torque characteristic curves of which are represented by the dotted line curves CT5 and BT5. It will be observed that, on a start, CT5 crosses BT5 at point H well above and later in time than point G. The vertically lined area denoted A6 in FIG. 11 represents the power overlap which occurs on such operation and, as will be seen, is much greater than area A5. It is in even sharper contrast to the situation that occurs if the clutch torque curve followed CT1 and the brake torque curve followed BT5, in which case the crossover point would be at I, considerably higher than H.

It will be observed that, on a stop, BT1 crosses CT4 at point J which is well below 50 percent of the rated torque. The horizontally lined area denoted A7 in FIG. 11 represents the total amount of power overlap which occurs on stopping, and, as will be seen, is quite small. Noting that power overlap is dissipated in the form of heat, this means that the amount of heat generated on a stop is low. This is in sharp contrast, for example, to the power overlap which would result from operation of the unit 19 at rated voltage and rated torque, noting that in such case BT5 crosses CT5 at point K well above and later in time than point J. The vertically lined area denoted A8 in FIG. 11 represents the power lap which occurs on such operation and, as will be seen, is much greater than area A7. It is in even sharper contrast to the situation that occurs if the brake torque curve followed BT1 and the clutch torque curve followed CT5, in which case the crossover point would be at L, considerably higher than K.

FIG. 12 illustrates an alternative mode of operation within the scope of this invention involving deenergization of the brake winding 77 of unit 19 before the start signal. In FIG. 12, wherein the horizontal coordinate represents time and the vertical coordinate represents percent of rated torque as in FIG. 11, the curve BTA represents the percent of rated torque developed by the brake on such operation. It will be observed that, on a signal to stop, the brake torque rapidly rises as indicated at BTA1 to a value of about 100 percent of the rated torque (again shown for purposes of illustration only), then rapidly drops down as indicated at BTA2 to a value substantially below the rated torque (about 55 percent of the rated torque as shown for purposes of illustration only), holds steady at this value as indicated at BTA3 until a signal to deenergize the brake winding occuring well before the next signal to start, and then drops off to 0 as indicated at BTA4 before the next signal to start. The curves CT and CT5 shown in FIG. 12 are the same as those shown in FIG. 11. The dotted-line curve BTA5 shown in FIG. 12 corresponds to curve BT5 of FIG. 11 modified to illustrate deenergization of the brake winding before a start. It will be observed that the effect of deenergizing the brake winding before a start is to eliminate the power overlap on a start (compare FIGS. 11 and 12 noting the absence of power overlap areas A5 and A6 from FIG. 12).

Figure 13:
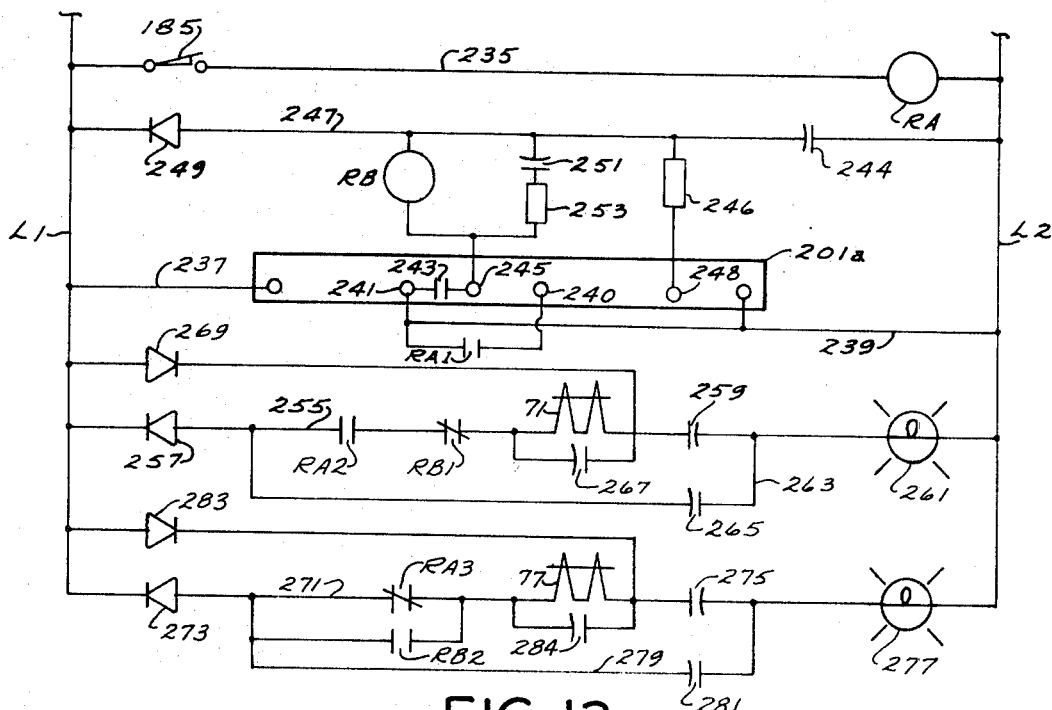

FIG. 13 shows a control system circuit for effecting rapid starting and stopping of the clutch output by overexcitation of the clutch and brake windings 71 and 77 in accordance with FIGS. 10 and 11. The circuit is connected across AC power lines L1 and L2. The fill cycle start switch 185 (e.g., a pedal-operated switch or a switch automatically operated in an automatic packaging operation) is connected across lines L1 and L2 in a series circuit 235 including a relay RA which is energized by the closing of the switch. Indicated at 201a is an interval timer (corresponding to 201) for timing out a predetermined interval following initiation of operation of the timer to control stopping of the auger, the timer being supplied with power by connections 237 and 239 across lines L1 and L2. It will be understood that a revolution counter for counting out a predetermined number of revolutions of the auger during a fill cycle may be used instead of the timer.

Connected with timer 201a are normally open contacts RA1 adapted to close upon energization of relay RA, connecting a terminal 240 of timer 201a to line L2 by means of the connection at 239 to initiate operation of the timer. Another terminal of the timer is indicated at 241. The timer (or counter) includes internal normally open contacts 243 which are closed by the timer upon termination of the timing interval (or after a predetermined number of auger revolution in the case of a counter) to effect stoppage of rotation of the auger, these contacts 243 bridging terminal 241 to another terminal 245. Connected to terminal 245 is a relay RB, this relay being connected in a circuit 247 in series with a diode 249 to line L1, this circuit being completed by closing of contacts 243 to energize relay RB by connection through diode 249 across lines L1 and L2. Connected in series across relay RB for arc suppression are a capacitor 251 and resistor 253. The circuit 247 also includes a capacitor 244 connected between diode 249 and line L2, and a resistor 246 providing a connection to a terminal 248 of timer 201a to permit it to start a timing signal on closing of contacts RA1.

The timer 201a controls the energization of the clutch and brake windings to achieve rapid starting and stopping by overexcitation of the windings, the clutch winding being indicated in FIG. 13 at 71 and the brake winding being indicated at 77.

Connected in a circuit 255 in series with one side of clutch winding 71 are normally closed contacts RB1 operated by relay RB and normally open contacts RA2 operated by relay RA, this circuit including a diode 257 for connection of the circuit to line L1. A capacitor 259 is connected from the other side of clutch winding 71 in series with an incandescent bulb 261 to line L2. This bulb constitutes a resistance which is relatively low when it is at a low temperature but which increases substantially when heated by current flowing therethrough. A circuit 263 including another capacitor 265 is connected between the junction of capacitor 259 and bulb 261 and the junction of diode 257 and contacts RA2. A capacitor 267 for suppressing sparking across the contacts RB1 upon opening is connected across clutch winding 71. Finally, a diode 269 is connected between line L1 and the junction of clutch winding 71 and capacitor 259, in opposite polarity sense from diode 257.

Brake winding 77 is connected across lines L1 and L2 in a circuit similar to that connecting clutch winding 71. One side of the brake winding is connected to line L1 in a series circuit 271 including normally closed contacts RA3 operated by relay RA, and a diode 273, the other side of the brake winding being connected to line L2 in series with a capacitor 275 and an incandescent bulb 277. Paralleling contacts RA3 are normally open contacts RB2 of relay RB. A circuit 279 including a capacitor 281 is connected between the junction of capacitor 275 and bulb 277 and the junction of diode 273 and contacts RA3. A diode 283 corresponding with diode 269 is connected between line L1 and the junction of brake winding 77 and capacitor 275. An arc suppression capacitor 284 across brake winding 77 is also provided.

Operation of the FIG. 13 circuit is substantially as follows:

It is assumed that lines L1 and L2 have been connected to a suitable source of AC power. Accordingly, a DC voltage is applied through diode 269 to cause changing of capacitor 259 substantially to line voltage. A DC voltage is also supplied through diode 257 (noting that it is connected to line L1 with opposite polarity sense from diode 269) to cause charging of capacitor 265. In similar fashion, diode 283 causes charging of capacitor 275 and diode 273 causes charging of capacitor 281.

Upon closing of switch 185, relay RA is energized, causing normally open contacts RA1 to close, and this initiates operation of timer 201a to begin timing of a timing interval. At the same time, contacts RA2 are closed and contacts RA3 are opened, the latter being opened to prevent energization of brake winding 77, and thus releasing the brake. Closing of contacts RA2 completes a circuit through closed contacts RB1 and clutch winding 71, this circuit including capacitors 259 and bulb 261. Because capacitors 259 and 265 were each charged substantially to line voltage, these voltages are added together when this circuit is closed by closing of contacts RA2, and this capacitively stored energy discharges through clutch winding 71, affecting energization of the clutch at a voltage substantially in excess of the rated voltage of the unit to start the operation of the auger.

Closing of contacts RA2 also connects clutch winding 71 across lines L1 and L2 in a circuit including diodes 269 and 257, capacitors 259 and 265 and bulb 261. Thus, power is supplied to clutch winding 71 by means of this circuit and the resulting current flows through bulb 261. This current quickly causes heating of the bulb to a stable heated condition and its resistance increases quickly to a higher value. The size and resistance characteristics of bulb 261 are chosen so that, when heated, its resistance is sufficient to drop the voltage across the clutch substantially below its rated voltage but to a level sufficient for development of clutch torque.

At the end of the time interval, timer 201a closes contacts 243 to energize relay RB and thus opening contacts RB1 and closing contacts RB2, the opening of contacts RB1 thereby deenergizing the clutch. Capacitors 275 and 281 of the brake circuit were charged substantially to line voltage by means of the circuits including diodes 283 and 273 and thus, upon closing of contacts RB2, capacitors 275 and 281 are connected in series with brake winding 77 causing the capacitors to discharge through the winding and thus effecting energization of the brake at a voltage substantially in excess of the rated voltage of the unit. In a manner substantially identical with the operation of the clutch circuit, current through bulb 277 causes an increase in its resistance and this has the effect of dropping the voltage across the brake to a holding voltage substantially below its rated voltage. The brake stops rotation of the auger and remains energized until a new fill cycle is initiated by operation of fill cycle start switch 185 to effect initiation of operation of the timer or revolution counter, operation of brake and clutch circuits being the same in either case, with the revolution counter similarly closing contacts 243 upon completion of rotation of the timer through a predetermined number of revolutions.

Figure 14:
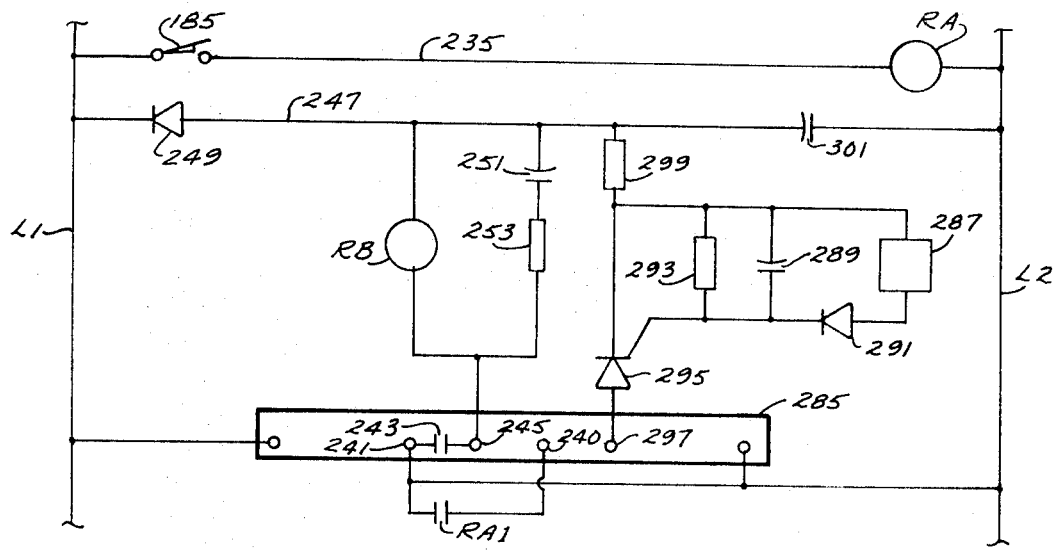

FIG. 14 illustrates a portion of a control system like that shown in FIG. 13 employing a timer, indicated at 285, similar to timer 201a except that timer 285 is not started in response to closure of relay RA, but is instead only readied for operation. A motion sensor means indicated at 287 such as described previously is instead provided to initiate operation of timer 285.

The output of motion sensor means 287 is supplied across a capacitor 289 through a diode 291 connected with motion sensor means 287. A resistor 293 is connected across the capacitor to allow the charge stored in the capacitor to bleed off when the motion sensor means is not being operated. Upon initiation of rotation of the rotor, the motion sensor means 287 supplies a signal which is stored on capacitor 289. This resultant voltage is used to trigger an SCR 295, this SCR having its anode connected to a terminal 297 on timer 285, and its cathode connected through a resistor 299 and diode 249 to line L1, this circuit further including a capacitor 301 connected between diode 249 and line L2.

Upon closing of fill start cycle switch 185, relay RA is energized to close contacts RA1 and RA2, closing of contacts RA1 readying timer 285 for operation, and closing of contacts RA2 effecting energization of clutch winding 71, thereby starting rotation of the auger. When the auger begins to rotate, motion sensor means 287 supplies an output signal causing triggering of SCR 295 and this effects initiation of timer 285 to begin a time interval. After completion of the time interval, timer 285 closes contacts 243 and the clutch is thereby deenergized and the brake energized in the same manner as previously described.

Figure 15:
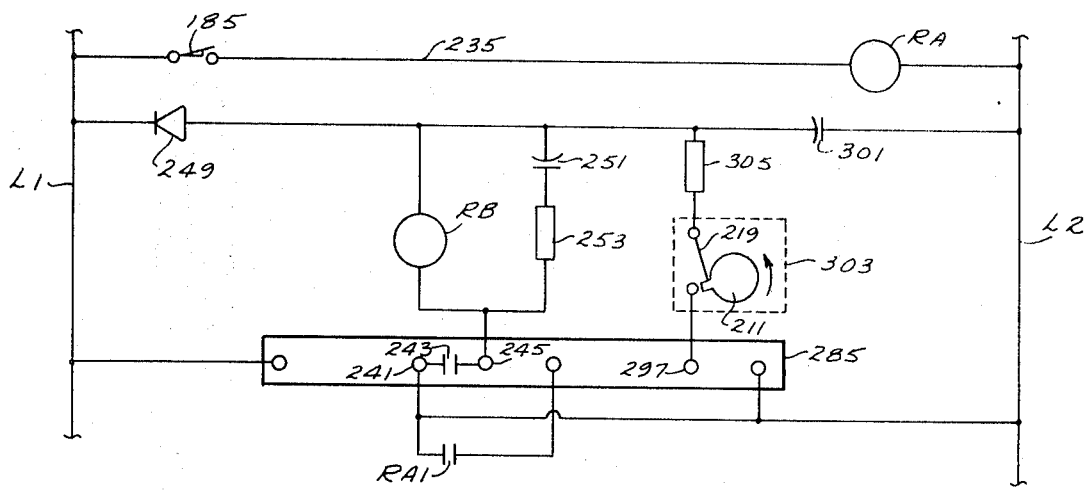
FIGS. 13–16 are wiring diagrams.

FIG. 15 illustrates the use of timer 285 in the manner of FIGS. 13 and 14 but including means, indicated at 303, as previously described, for delaying the start of timer 285 until the auger has rotated through a predetermined fraction of its full predetermined number of revolutions. Switch-actuating signal disk or cam 211 is mounted for rotation by the auger drive shaft so that it engages and closes a switch 219, causing a holding circuit to close, after a complete revolution or fraction of the full predetermined number of revolutions. Switch 219 is connected in a circuit including a resistor 305 and diode 249 from line L1 to terminal 297 of timer 285 to cause the timer to begin timing out a time interval. Operation of the system is the same as that shown in FIGS. 13 and 14 except that the timer does not begin to time out the time interval until switch 219 is actuated.

Figure 16:
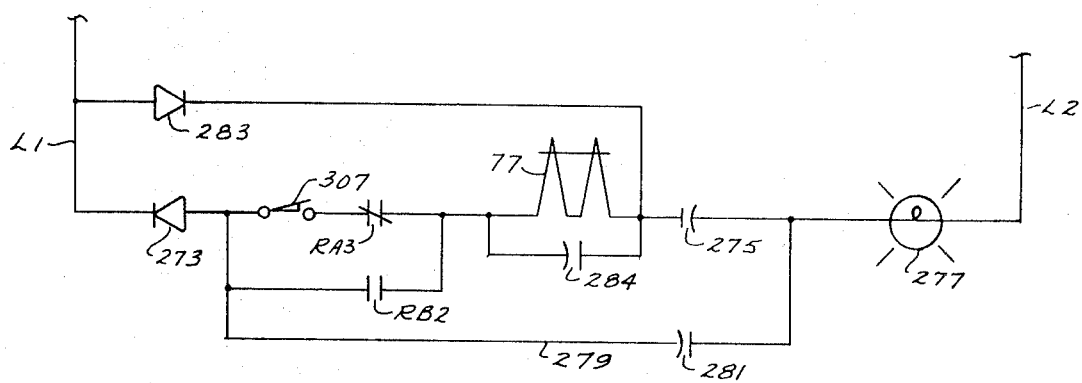

FIG. 16 illustrates only the brake control portion of a control system for operation in accordance with FIG. 12 wherein a switch 307 is included in the circuit in series with contacts RA3, switch 307 being normally closed, but being opened by a cam (not shown) of an automatic filling operation, for example, after completion of a fill cycle to deenergize brake winding 77, the brake otherwise normally being energized so long as the filler is stopped, i.e., between fill cycles. Deenergization of the brake by switch 307 upon completion of a fill cycle insures that, upon initiation of a new fill cycle (by closing fill cycle start switch 185, as shown in FIG. 13), there will be no lag in deenergization of the brake such as there otherwise would be and thus no overlap of clutch and brake energization on start up of the fillers.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An auger filler comprising a receptacle for containing a fluent material to be metered out, said receptacle having an outlet, an auger for feeding the fluent material from the receptacle out through the outlet, the amount of material fed out through the outlet being a function of the number of revolutions of the auger, means for operating the auger comprising a clutch having an input and an output, means for driving the clutch input, speed reduction means between the clutch output and the auger for driving the auger at a lower speed than the clutch output when the clutch is engaged, means for effecting engagement of the clutch to drive the auger at said lower speed, and control means operable on completion of rotation of the auger through a predetermined number of revolutions for effecting disengagement of the clutch to stop the auger, said control means comprising a timer adapted after a predetermined time interval following initiation of operation of the timer to effect disengagement of the clutch, and means for initiating operation of the timer in response to engagement of the clutch, wherein said means for initiating operation of the timer is responsive to initiation of rotation of the clutch output and comprises means for generating an electrical signal in response to rotation of the clutch output and transmitting it to said timer to initiate operation of the timer, and said means for generating the electrical signal comprising an electromagnetic pickup having its output electrically connected to the timer and means rotatable with the clutch output operable on the pickup to cause it to generate an electrical signal.

2. An auger filler comprising a receptacle for containing a fluent material to be metered out, said receptacle having an outlet, an auger for feeding the fluent material from the receptacle out through the outlet, the amount of material fed out through the outlet being a function of the number of revolutions of the auger, means for operating the auger comprising a clutch having an input and an output, means for driving the clutch input, speed reduction means between the clutch output and the auger for driving the auger at a lower speed than the clutch output when the clutch is engaged, means for effecting engagement of the clutch to drive the auger at said lower speed, and control means operable on completion of rotation of the auger through a predetermined number of revolutions for effecting disengagement of the clutch to stop the auger, said control means comprising a timer adapted after a predetermined time interval following initiation of operation of the timer to effect disengagement of the clutch, and means for initiating operation of the timer in response to engagement of the clutch, wherein said means for initiating operation of the timer comprises means for delaying initiation of operation of said timer until the auger has rotated through a predetermined amount less than said predetermined number of revolutions.

3. An auger filler as set forth in claim 2 wherein said delaying means effects delay of initiation of operation of the timer until the clutch output has made substantially one full revolution.

4. An auger filler comprising a receptacle for containing a fluent material to be metered out, said receptacle having an outlet, an auger for feeding the fluent material from the receptacle out through the outlet, the amount of material fed out through the outlet being a function of the number of revolutions of the auger, means for operating the auger comprising a clutch having an input and an output, means for driving the clutch input, speed reduction means between the clutch output and the auger for driving the auger at a lower speed than the clutch output when the clutch is engaged, means for effecting engagement of the clutch to drive the auger at said lower speed, and control means operable on completion of rotation of the auger through a predetermined number of revolutions for effecting disengagement of the clutch to stop the auger, wherein the clutch is an electromagnetic clutch having a rated voltage and a rated torque, the rate torque being in excess of that required for driving the auger under load, and wherein the means for effecting engagement of the clutch includes means for initially effecting energization of the clutch at a voltage substantially in excess of the rated voltage of the clutch and then dropping the voltage to a holding voltage substantially below said rated voltage but sufficient for development of auger driving torque.

5. An auger filler comprising a receptacle for containing a fluent material to be metered out, said receptacle having an outlet, an auger for feeding the fluent material from the receptacle out through the outlet, the amount of material fed out through the outlet being a function of the number of revolutions of the auger, means for operating the auger comprising a clutch having an input and an output, means for driving the clutch input, speed reduction means between the clutch output and the auger for driving the auger at a lower speed than the clutch output when the clutch is engaged, means for effecting engagement of the clutch to drive the auger at said lower speed, and control means operable on completion of rotation of the auger through a predetermined number of revolutions for effecting disengagement of the clutch to stop the auger, said control means comprising an electromagnetic brake having a rated voltage and a rated torque, the rated torque being in excess of the required for stopping the auger, and said control means including means for initially effecting energization of the brake at a voltage substantially in excess of said rated voltage and then dropping the voltage to a holding voltage below said rated voltage.

6. An auger filler as set forth in claim 5 wherein the clutch is an electromagnetic clutch having a rated voltage and a rated torque, the rated torque being in excess of that required for driving the auger under load, and wherein the means for effecting engagement of the clutch includes means for initially effecting energization of the clutch at a voltage substantially in excess of the rated voltage of the clutch and then dropping the voltage to a holding voltage substantially below said rated voltage but sufficient for development of auger driving torque.

7. An auger filler as set forth in claim 6 further having means for deenergizing the brake prior to energization of the clutch.

8. An auger filler comprising a receptacle for containing a fluent material to be metered out, said receptacle having an outlet, an auger for feeding the fluent material out of the receptacle, the amount of material fed out through the outlet being a function of the number of revolutions of the auger, means for operating the auger comprising an electromagnetic clutch and brake unit having its output connected to the auger for applying torque to the auger, said unit having a rated voltage and a rated torque, the rated torque being in excess of that required for driving the auger under load, and control means for said unit comprising means for energizing the clutch of the unit to start the operation of the auger and means operable on completion of rotation of the auger through a predetermined number of revolutions for deenergizing the clutch and energizing the brake of the unit to stop the auger, said clutch energizing means including means for initially effecting energization of the clutch at a voltage substantially in excess of the rated voltage of the unit and then dropping the voltage to a holding voltage substantially below said rated voltage but sufficient for development of auger driving torque, and said brake energizing means including means for initially effecting energization of the brake at a voltage substantially in excess of the rated voltage of the unit and then dropping the voltage to a holding voltage substantially below said rated voltage.

9. An auger filler as set forth in claim 8 wherein said control means includes a revolution counter for counting the number of revolutions of the clutch output.

10. An auger filler as set forth in claim 8 wherein said control means comprises a timer adapted after a predetermined time interval following initiation of operation of the timer to effect deenergization of the clutch from said holding voltage and energization of said brake, and means for initiating operation of the timer in response to engagement of the clutch.

11. An auger filler as set forth in claim 10 wherein said means for initiating operation of the timer is responsive to initiation of rotation of the clutch output.

12. An auger filler as set forth in claim 11 wherein said means for initiating operation of said timer comprises means for generating an electrical signal in response to rotation of the clutch output and transmitting it to said timer to initiate operation of the timer.

13. An auger filler as set forth in claim 12 wherein the means for generating the electrical signal comprises an electromagnetic pickup having its output electrically connected to the timer and means rotatable with the clutch output operable on the pickup to cause it to generate an electrical signal.

14. An auger filler as set forth in claim 10 wherein the means for initiating operation of the timer comprises means for delaying initiation of operation of said timer until the auger has rotated through a predetermined amount less than said predetermined number of revolutions.

15. An auger filler as set forth in claim 14 wherein said delaying means effects delay of initiation of operation of the timer until the clutch output has made substantially one full revolution.

16. An auger filler as set forth in claim 8 further having means for deenergizing the brake prior to energization of the clutch.

17. An auger filler comprising a hopper for containing a fluent material to be dispensed having an auger tube at the bottom, a spindle extending down through the hopper having an auger at its lower end rotatable in the auger tube, a shaft extending generally horizontally above the auger, gearing between the shaft and the spindle, an electromagnet clutch and brake unit spaced laterally from the hopper having an input and an output, a motor spaced laterally from the hopper for driving the input of said unit, the output of said unit being connected to said shaft, and means for controlling said unit to effect starting and stopping of the auger, wherein said gearing is a speed reduction gearing for driving the auger at a lower speed than the output of said unit, wherein said control means comprises means for effecting energization of the clutch to start the auger, and means operable on completion of rotation of the auger through a predetermined number of revolutions for deenergizing the clutch and energizing the brake, wherein said means operable on completion of rotation of the auger through a predetermined number of revolutions comprises a timer adapted after a predetermined time interval following initiation of operation of the timer to effect deenergization of the clutch and energization of the brake, and means for initiating operation of the timer in response to operation of the clutch, wherein said means for initiating operation of the timer is responsive to rotation of said shaft and comprises means for generating an electrical signal in response to rotation of said shaft and transmitting it to said timer to initiate operation of the timer, said means for generating the electrical signal comprising an electromagnetic pickup having its output electrically connected to the timer and means rotatable with the shaft operable on the pickup to cause it to generate an electrical signal.

18. An auger filler comprising a hopper for containing a fluent material to be dispensed having an auger tube at the bottom, a spindle extending down through the hopper having an auger at its lower end rotatable in the auger tube, a shaft extending generally horizontally above the auger, gearing between the shaft and the spindle, an electromagnet clutch and brake unit spaced laterally from the hopper having an input and an output, a motor spaced laterally from the hopper for driving the input of said unit, the output of said unit being connected to said shaft, and means for controlling said unit to effect starting and stopping of the auger, wherein said gearing is a speed reduction gearing for driving the auger at a lower speed than the output of said unit, wherein said control means comprises means for effecting energization of the clutch to start the auger, and means operable on completion of rotation of the auger through a predetermined number of revolutions for deenergizing the clutch and energizing the brake, wherein said means operable on completion of rotation of the auger through a predetermined number of revolutions comprises a timer adapted after a predetermined time interval following initiation of operation of the timer to effect deenergization of the clutch and energization of the brake, and said auger filler having means for initiating operation of the timer in response to operation of the clutch comprising means for delaying initiation of operation of said timer until the auger has rotated through a predetermined amount less than said predetermined number of revolutions.

19. An auger filler as set forth in claim 18 wherein said delaying means effects delay of initiation of operation of the timer until the shaft has made substantially one full revolution.

* * * * *